US012775741B2

(12) United States Patent
Choncholas et al.

(10) Patent No.: US 12,775,741 B2
(45) Date of Patent: Oct. 27, 2026

(54) SYSTEMS AND METHODS FOR LOCALIZATION OFFLOADING USING FLEXIBLE MULTI-PARTY COMPUTATION AND SPLIT DEVICE NETWORK RESOURCES FOR PRESERVING PRIVACY

(71) Applicant: Telefonaktiebolaget LM Ericsson (PUBL), Stockholm (SE)

(72) Inventors: James Gary Choncholas, Atlanta, GA (US); Gregoire Phillips, Hayward, CA (US)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 72 days.

(21) Appl. No.: 18/716,192

(22) PCT Filed: Dec. 8, 2021

(86) PCT No.: PCT/IB2021/061463
§ 371 (c)(1),
(2) Date: Jun. 4, 2024

(87) PCT Pub. No.: WO2023/105268
PCT Pub. Date: Jun. 15, 2023

(65) Prior Publication Data

US 2025/0036802 A1 Jan. 30, 2025

(51) Int. Cl.
*G06F 21/62* (2013.01)

(52) U.S. Cl.
CPC ...... *G06F 21/6254* (2013.01); *G06F 21/6245* (2013.01)

(58) Field of Classification Search
CPC ...... G06F 21/60; G06F 21/62; G06F 21/6218; G06F 21/6245; G06F 21/6254
See application file for complete search history.

(56) References Cited

U.S. PATENT DOCUMENTS

| | | | | |
|---|---|---|---|---|
| 2016/0259032 | A1* | 9/2016 | Hehn | G01S 1/024 |
| 2020/0252457 | A1* | 8/2020 | Zakrzewski | H04L 9/0637 |
| 2022/0187841 | A1* | 6/2022 | Ebrahimi Afrouzi | G01C 21/12 |

OTHER PUBLICATIONS

Yan, J. et al., Privacy-Preserving Localization for Underwater Sensor Networks via Deep Reinforcement Learning, Jan. 5, 2021, IEEE Transactions on Information Forensics and Security, vol. 16, 2021, p. 1880-1895. (Year: 2021).*

(Continued)

*Primary Examiner* — D'Arcy Winston Straub
(74) *Attorney, Agent, or Firm* — Baker Botts L.L.P.

(57) ABSTRACT

A method (1100) by a server (120) is provided for improving the performance of iterative localization algorithms run using privacy preserving techniques. The method begins when the server receives (1105), from a device 105, information associated with an environment of the device. Based on the information associated with the environment of the device, the server runs (1110) a localization algorithm using privacy preserving techniques. Prior to iterative steps in the localization algorithm reaching a maximum number of iterations, the server identifies (1115) at least one break condition released intermittently when running the localization algorithm. Based on the at least one break condition identified while running the localization algorithm, the server ceases (1120) the localization algorithm before the maximum number of iterations has been reached and transmits a localization result to the device.

20 Claims, 12 Drawing Sheets

(56) References Cited

OTHER PUBLICATIONS

Mou Wu et al., "A Consensus-Based Diffusion Levenberg-Marquardt Method for Collaborative Localization with Extension to Distributed Optimization" , vol. 8, 2020.
Daniel Demmler et al., "ABY—A Framework for Efficient Mixed-Protocol Secure Two-Party Computation", Feb. 2015.
Joshua J. Engelsma et al. "HERS: Homomorphically Encrypted Representation Search", Submitted to IEEE Transaction on Biometrics, Behavior, and Identity Science, May 25, 2021.
Kunal Chelani et al., "How Privacy-Preserving are Line Clouds? Recovering Scene Details from 3D Lines", 2021.
Mihai Dusmanu et al., "Privacy-Preserving Image Features via Adversarial Affine Subspace Embeddings", 2021.
Pablo Speciale et al., "Privacy Preserving Image Queries for Camera Localization"—2019.
Yuan Meng et al., "Privacy Preserving Localization Algorithm for Underwater Sensor Networks" proceedings of the 39th Chinese Control Conference, Jul. 27-29, 2020, Shenyang, China.
Li Wan et al., "Privacy-Preservation for Gradient Descent Methods" Research Track Paper, Aug. 12-15, 2007.
PCT International Search Report issued for International application No. PCT/IB2021/061463—Aug. 1, 2022.
PCT Written Opinion of the International Searching Authority issued for International application No. PCT/IB2021/061463—Aug. 1, 2022.

* cited by examiner

SYSTEMS AND METHODS FOR LOCALIZATION OFFLOADING USING FLEXIBLE MULTI-PARTY COMPUTATION AND SPLIT DEVICE NETWORK RESOURCES FOR PRESERVING PRIVACY

PRIORITY

This nonprovisional application is a U.S. National Stage Filing under 35 U.S.C. § 371 of International Patent Application Serial No. PCT/IB2021/061463 filed Dec. 8, 2021 and entitled "SYSTEMS AND METHODS FOR LOCALIZATION OFFLOADING USING FLEXIBLE MULTI-PARTY COMPUTATION AND SPLIT DEVICE NETWORK" which is hereby incorporated by reference in its entirety.

TECHNICAL FIELD

The present disclosure relates, in general, to wireless communications and, more particularly, systems and methods for localization offloading using privacy-preserving technique such as flexible Multi-Party Computation (MPC) and split device network resources for preserving privacy.

BACKGROUND

Localization is the process in which devices find their position and orientation within a known environment. The process typically uses two dimensional input data to determine a position in a three dimensional known map. It is a fundamental feature used in the domains of augmented reality, robotics, and autonomous vehicles. Ensuring that localization happens efficiently and securely is quintessential for enabling such applications. Several existing technologies seek to address the potential privacy risks inherent in the localization process.

Localization may pose a challenge, however, to resource-constrained devices due to the high volume of computational resources required. Furthermore, complex and dynamic environments exacerbate resource requirements. For this reason, several new technologies in robotics and extended reality domains have proposed cloud-assisted and edge-assisted processes of localization that split the localization processing across the UE and one or more cloud-based or edge-based servers. This is referred to as offloaded localization.

Aside from processing efficiency concerns, privacy issues abound in offloaded localization. Existing privacy-sensitive localization technologies rely on obfuscation, which is the altering of environmental features in a way that makes their discernment and identification difficult, cumbersome, or prohibitively resource-expensive for consumer-grade devices, to protect the privacy of end users and bystanders whose information may be leaked to the edge-cloud and any connected parties during the localization process.

For example, one previous technique provides an obfuscation-based framework that constructs "line clouds" out of 3D feature lines intersecting with critical feature points. See, Speciale et al. *Privacy Preserving Image Queries for Camera Localization*, International Conference on Computer Vision (ICCV), October 2019. This method is meant to obscure the image by relying on feature lines aligned with particular designations of point-line intersections that prevent reconstruction of the original features, and thus fully reconstructing the image. However, under certain conditions, it is possible to reconstruct the localization environment with the line cloud information.

Another obfuscation-based framework is based on affine subspace embeddings of key feature points associated with private information. See, Dusmanu et al., *Privacy-Preserving Image Features via Adversarial Affine Subspace Embeddings*, CVPR Open Access Repository, 2021. This method avoids some of the pitfalls of the proposed line cloud method but is vulnerable to leaking location-revealing data in a localization context.

An alternative homomorphic encryption-based framework for privacy-preserving localization has also been proposed. See, Engelsma et al., *HERS: Homomorphically Encrypted Representation Search*. Arxiv Open Access Repository, May 2021. While this method achieves an information-theoretic degree of security, it does so at the expense of efficiency. The method exhibits an unrealistically high computational overhead in nearly every feasible application.

Certain techniques for providing efficient localization processing have engaged with state-of-the-art multi-party computation (MPC) tools. MPC, which is also known as secure MPC, is a field of cryptography that seeks to allow two or more parties to securely perform operations on confidential data without revealing any features of that data to the collaborators. One such MPC framework is ABY, which is a protocol allowing for three different types of MPC circuit construction. See, Demmler et al., ABY—*A framework for Efficient Mixed-Protocol Secure Two-Party Computation*, NDSS, 2015. Specifically, the three types of MPC circuit construction include Arithmetic, Boolean, and Yao. Protocols with flexibility, such as this one, allow for more efficient implementations of localization methods.

There currently exist certain challenges, however. For example, existing offloading technologies for complex computational functions such as localization and mapping focus on obfuscation techniques to protect the privacy of individuals and sensitive objects/locations captured in the localization process. Obfuscation techniques may be robustly secure to resource- or capability-constrained devices seeking to identify obfuscated content, but several emerging studies have highlighted the risk to such methods when exposed to attacks from cutting edge, resource-abundant devices. For example, a study has shown how several critical geometric features can be recovered from scenes protected by state-of-art "line cloud" obfuscation techniques. See, Chelani et al., *How Privacy-Preserving are Line Clouds? Recovering Scene Details from* 3D *Lines*, CVPR Open Access Repository, 2021.

Other obfuscation techniques share a similar vulnerability. Specifically, given an adversary with unconstrained resources, each of these is theoretically vulnerable to the same threat.

While obfuscation relies on increasing the level of complexity in uncovering private information in content, the ability for sufficiently resourced machines to overcome this protection highlights a critical problem in this line of defense: a lack of information-theoretic security. An ideal protection for sensitive data would be an informationally secure privacy-preserving solution. Such a solution would protect the privacy of people, places, or things in a device's environment from even the most well-resourced adversary. Additionally, existing "line cloud" obfuscation techniques further degrade when run on multiple query images which are similar, for example, on each frame in a video.

SUMMARY

Certain aspects of the disclosure and their embodiments may provide solutions to these or other challenges. For example, methods and systems are provided that allow a device to offload localization without disclosing sensitive or identifiable environmental data to offload servers. Certain embodiments provide a practical, secure offloading framework as a more functional and privacy-preserving alternative to current state-of-art methods.

According to certain embodiments, a method by a server is provided for improving the performance of iterative localization algorithms run using privacy preserving techniques. The method includes receiving, from a device, information associated with an environment of the device. Based on the information associated with the environment of the device, the server runs a localization algorithm using privacy preserving techniques. Prior to iterative steps in the localization algorithm reaching a maximum number of iterations, the server identifies at least one break condition released intermittently when running the localization algorithm. Based on the at least one break condition identified while running the localization algorithm, the server ceases the localization algorithm before the maximum number of iterations has been reached and transmits a localization result to the device.

According to certain embodiments, a server is provided for improving the performance of iterative localization algorithms run using privacy preserving techniques. The server is adapted to receive, from a device, information associated with an environment of the device. Based on the information associated with the environment of the device, the server is adapted to run a localization algorithm using privacy preserving techniques. Prior to iterative steps in the localization algorithm reaching a maximum number of iterations, the server is adapted to identify at least one break condition released intermittently when running the localization algorithm. Based on the at least one break condition identified while running the localization algorithm, the server is adapted to cease the localization algorithm before the maximum number of iterations has been reached and transmit a localization result to the device.

According to certain embodiments, a method by a device is provided for improving the performance of iterative localization algorithms run using privacy preserving techniques. The method includes transmitting, to at least one server performing a localization algorithm that includes iterative steps, an indication of at least one break condition to be identified while performing the localization algorithm prior to reaching a minimum number of iterations. The device transmits, to the at least one server, at least a portion of information associated with an environment of the device for processing using the localization algorithm.

According to certain embodiments, a device is provided for improving the performance of iterative localization algorithms run using privacy preserving techniques. The device is adapted to transmit, to at least one server performing a localization algorithm that includes iterative steps, an indication of at least one break condition to be identified while performing the localization algorithm prior to reaching a minimum number of iterations. The device is adapted to transmit, to the at least one server, at least a portion of information associated with an environment of the device for processing using the localization algorithm.

Certain embodiments of the present disclosure may provide one or more technical advantages. For example, certain embodiments may provide a first-of-its-kind privacy-preserving localization offloading method for network-connected devices. A technical advantage may be that the method provides an information-theoretic guarantee of data privacy that ensures that offloaded localization is aligned with the security goals of offloaded localization.

As another example, certain embodiments may provide a technical advantage of offloading capability and flexibility, allowing users of devices to select the option that best fits their processing and network requirements.

As still another example, certain embodiments may provide a technical advantage of implementation flexibility, which allows users to adapt the implementation of our method to future more efficient MPC protocols and different security models without losing the privacy-preserving benefits or fundamentally altering the execution.

As still other examples, certain embodiments may provide one or more of the following technical advantages as compared to previous methods and techniques:

- using secure MPC as a technique to offload localization in a privacy preserving way.
- providing both formal and stronger security guarantees in contrast to existing obfuscation-based techniques;
- providing efficiencies in contrast to previous homomorphic encryption techniques; and/or
- providing a method that is not vulnerable to side channel attacks in contrast to hardware-based solutions such as TEE-based techniques.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Some of the embodiments contemplated herein will now be described more fully with reference to the accompanying drawings. Embodiments are provided by way of example to convey the scope of the subject matter to those skilled in the art.

According to certain embodiments described herein, an efficient localization method is provided that is capable of offloading computationally expensive tasks from device to network attached resources in a privacy preserving manner. This allows localization tasks that are operated on confidential data to be offloaded to untrusted servers such as, for example, when the environment contains sensitive information that is typically not trusted to leave the device domain. To accomplish this goal, a localization method is combined with a privacy-preserving, computation framework, MPC. Thus, the localization process is conducted under MPC, which exposes intermediate information considered to break traditional cryptographic guarantees but does not subvert privacy goals specific to localization. Stated differently, whereas doing so naively results in poor performance, certain embodiments described herein relax the formal cryptographic definition of security and improve efficiency and speed by orders of magnitude.

The goal of privacy preserving localization is to prevent network resources from reconstructing the input image, map, or the resulting pose. Certain embodiments distinguish which intermediate information is acceptable to reveal without subverting localization-specific security goals. Thus, certain embodiments enable usage for a greater number of applications for which speed is critical. Doing so is nontrivial as relaxing the formal security model too much, while it may further improve efficiency, will subvert the overall security goals of privacy preserving localization.

Figure 1:
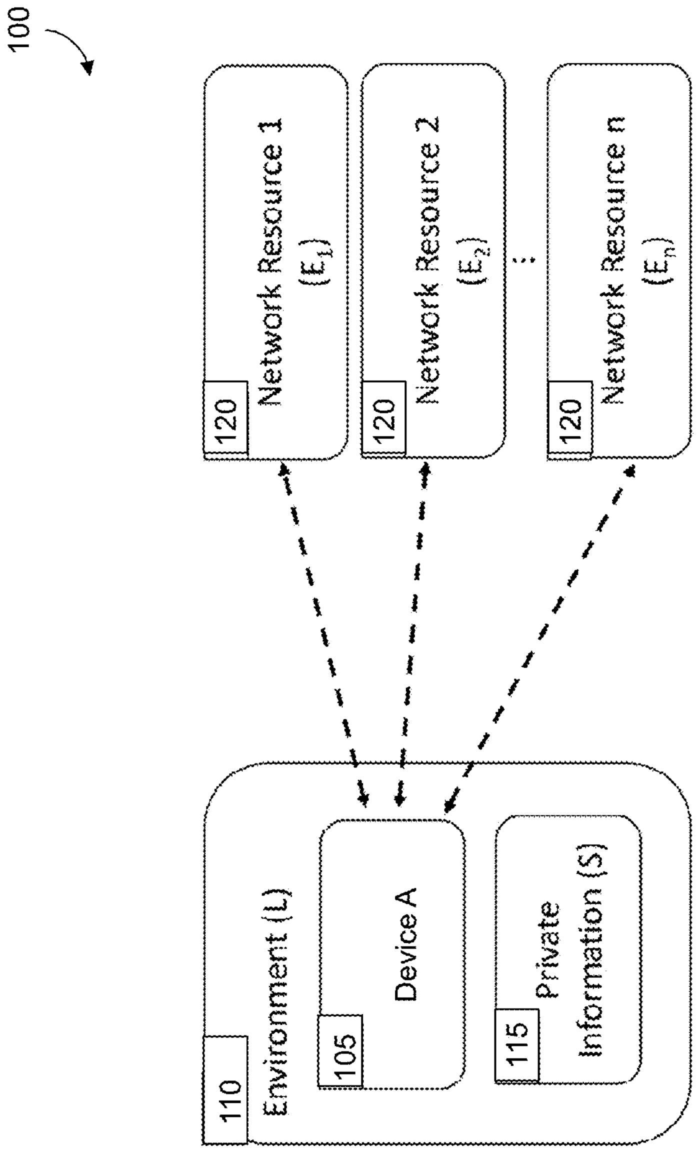
FIG. 1 illustrates an example system for localization offloading using flexible MPC and split device network resources for preserving privacy, according to certain embodiments.

FIG. 1 illustrates an example system 100 for localization offloading using flexible MPC and split device network resources for preserving privacy, according to certain embodiments. For example purposes, the following scenario, which is illustrates in FIG. 1, may be considered:

1. Assume a network-connected device A, also depicted as device 105, capable of performing localization through a combination of on-device and external resources. Thus, device A includes sufficient hardware and compute to perform and/or offload the privacy-preserving localization process. It is advantageous for the device to outsource computation steps required for localization. This is common for many reasons: the device may be battery operated and would like to conserve power or the device may be experiencing contention for resources shared between localization and other tasks (e.g., Central Processing Unit (CPU), Random Access Memory (RAM), etc.). Device 105 can be a UE as described herein (e.g., 512A-512D, 600, 1006).
2. Assume an environment L in which localization will occur. Specifically, environment L, is the environment in which device A, is localizing and is depicted with reference numeral 110 in FIG. 1. This environment contains some amount of private information, S, that device A is not permitted to share with outside entities-including network providers and network resources. Information S, which is indicated by reference numeral 115 in FIG. 1, may include any information that is protected by existing policy or regulation and, therefore, should not be leaked to the edge.
   For example, L may be a smart factory environment in which device A is a network-enabled drone aiding in the monitoring of a critical production process. In this case, S may be defined as any information that the user of device A does not want to, or is legally compelled not to, disclose to outside parties. S may therefore include identifiable information about employees, critical manufacturing secrets, or confidential partner information that may be inferred from images or information captured during the localization process.
3. Network resources $E_1$, $E_2$, and up to $E_n$ are resources with which device A is connected and are illustrated in FIG. 1 with reference numeral 120. Device A shall offload some or all tasks needed to perform localization to these resources. Device A is at risk of disclosing some or all private information S to $E_1$ and $E_2$ (up to $E_n$) during this process. In line with the example above, these resources $E_1$ and $E_2$ (up to $E_n$) may be edge or cloud computing facilities and/or servers that are connected to a network. The embodiments described herein may be flexible as to the number of network resources so long as that number is greater than two. However, for simplicity, the embodiments described herein are limited to two network resources. Network resources $E_1$. $E_2$ . . . . $E_n$ can each be a host as described herein (e.g., 800, 1002, a virtual server as described herein (e.g., 902), or even a network node as described herein (e.g., 700, 1004).

Certain of these features and/or elements are described in more detail below.

Localization Environment (L)

According to certain embodiments, the localization environment L comprises of a defined space in which the device A must infer its position in three dimensional space from some set of environmental inputs captured on-device. Location environment L is indicated by reference numeral 110 in FIG. 1. Most commonly, these environmental inputs are derived from images captured using an on-device Red, Green and Blue (RGB) camera sensor or Red, Green, and Blue-Depth Image (RGBD) Light Detection and Ranging (LiDAR) sensors. Some examples of use case environments that may require privacy-preserving technologies if offloading occurs would be (but are not limited to):

Factory settings: corporations operating factories with network-connected robotic or user assisting devices requiring localization may seek to protect their industry secrets from potential competitors colluding with or infiltrating either the network or the edge processing resources.

Hospital or medical care centers: medical care providers are held to high legal and ethical privacy standards-particularly in the processing, exchange, and storage of sensitive medical information of their clients/users. Medical care settings that offload to network and edge resources may adopt such a method to ensure that their devices requiring localization don't leak sensitive private health information restricted by law or corporate regulation.

Network Connected Device

A network connected device, which is referred to herein as device A and indicated by reference numeral 105 in FIG. 1, may range from autonomous robotic devices such as drones or assistive user equipment (UE) such as heads-up displays, augmented reality glasses, or fully immersive virtual reality headset devices (this listing is not comprehensive). Device A may contain, in certain embodiments, the following features and capabilities:

Hardware enabling device A to capture some set of inputs from the environment. This hardware may be a camera, LiDAR sensor, or any other sensor enabling that device to localize in an environment.

Sufficient processing capabilities to, at minimum, perform device-side processing required for the offloading process.

Private Information(S)

Private information S is indicated with reference numeral 115 in FIG. 1 and encompasses any information a user or involved party does not want to, should not, or is compelled by law or regulation not to disclose beyond a pre-defined trusted set of actors. In the context of localization, private information may include any information (visual information, location information, or any other distinguishable characteristic) that can be derived from the data used in the localization process. Even information that is captured but not used in the localization process may be private information that needs to be properly protected to avoid leakage to any offloaded party that is not fully trusted.

Leakage (access without permission) of private information may occur in at least four relevant contexts: private information may be intrusively accessed on device A from an external attacker, it may be intrusively accessed during communication with another party, it may be intrusively accessed on a server or device with which the information was shared, or it may be viewed or shared in an intrusive (and unauthorized) way by the party with which it was shared. Certain embodiments described herein address the latter three contexts: privacy intrusion during communication, by an external attacker at the shared server level, and intrusion or violation by one or more of the servers involved in offloaded computation itself.

Network Resources ($E_1$, $E_2$, and Up to $E_n$)

According to certain embodiments, network resources $E_1$, $E_2$, and up to $E_n$, which are indicated with reference numeral 120 in FIG. 1, include any resource connected to device A by a network facilitating the exchange of information. These devices must receive information from device A and take on some portion of the operations required for the localization process. These resources should have the requisite processing and operating capabilities necessary to carry out the operations offloaded to them. Examples include edge and cloud servers located remotely from device A, and network-owned resources that distribute computational tasks across the network in a comparable fashion.

Certain embodiments described herein impose several assumptions regarding network resources. First, from a security standpoint, these resources (and potentially the network itself) are untrusted in this framework. Untrusted here means that the user does not want to reveal any features of the private information to the network-connected resources. If the resources were trusted, then this condition would be violated, and this method would be superfluous. Second, in one particular embodiment, there must be at least two resources, at least one of which is honest, to which the device can offload localization processing. The secret-sharing protocol underlying MPC requires that the private information be split across at least two parties to prevent either party from gaining access to any features of the private information. If all participating parties collude (i.e., broadcast features of the shared information) then private information is revealed and the method will no longer be privacy-preserving.

Figure 2:
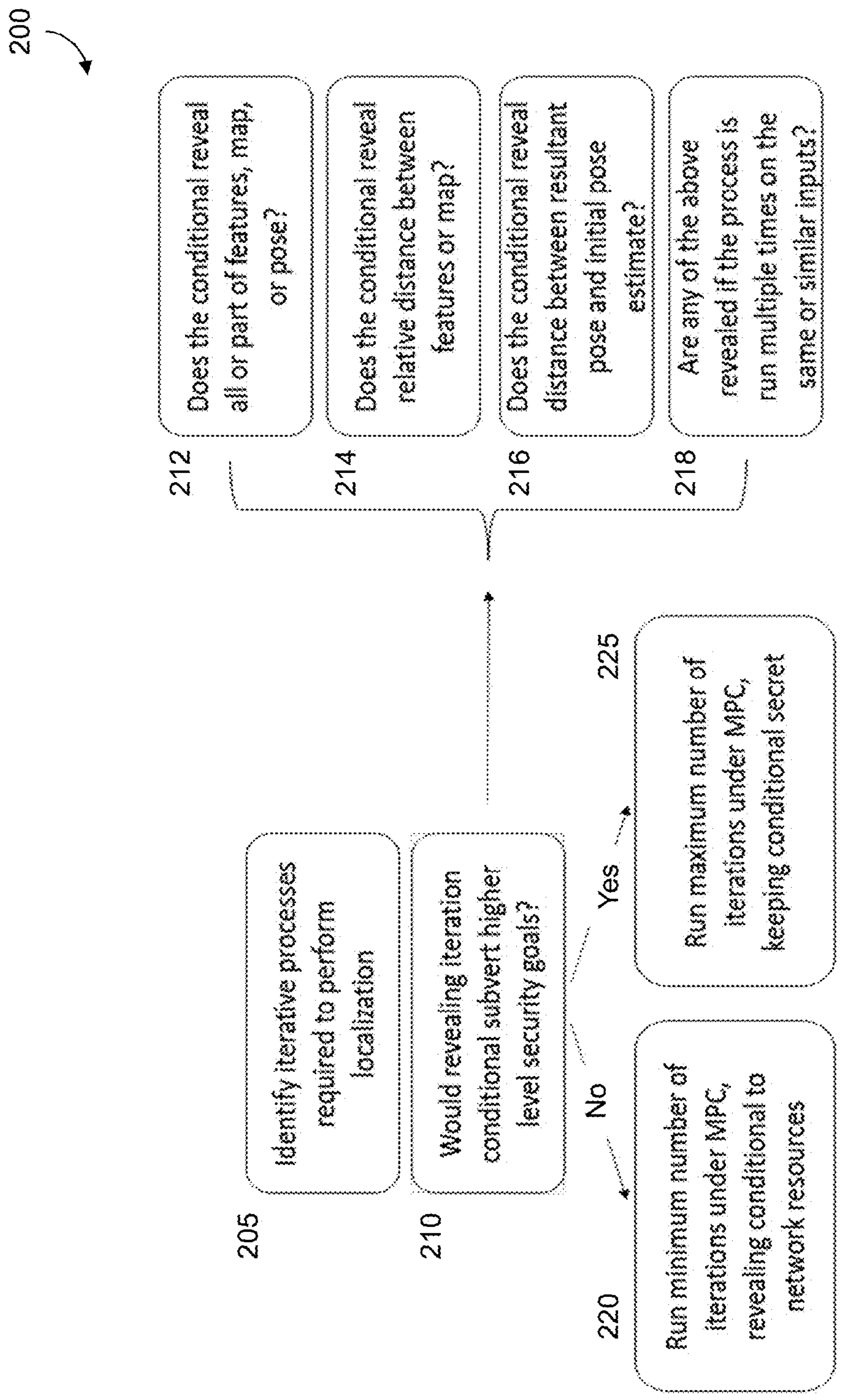
FIG. 2 illustrates an example method for determining intermediate information S that is acceptable to reveal to network resources $E_1$ and $E_2$ to improve localization performance, according to certain embodiments.

FIG. 2 illustrates an example method 200 for determining intermediate information S that is acceptable to reveal to network resources $E_1$ and $E_2$ (up to $E_n$) to improve localization performance, according to certain embodiments. In a particular embodiment, the method 200 may be performed by a user controlling the device A 105. However, it is recognized that device A 105 may be configured to perform method 200 independently, in certain other embodiments.

At step 205, the iterative processes required to perform localization are identified. A determination is then performed at step 210 as to whether revealing the iteration conditional would subvert higher level security goals. As used herein, the iteration conditional may include any break condition (e.g., a Boolean flag) that occurs and/or is identified before a maximum (i.e., specified) number of iterations is reached. In a particular embodiment, this step may include any one or more of the following sub-steps:

determine whether the conditional reveals all or part of the features, map, or pose associated with the environment L, at step 212;

determine whether the conditional reveals relative distance between features or map, at step 214;

determine if the conditional reveals distance between resultant pose and an initial pose estimate, at step 216; and/or determine if any of the above characteristics are revealed if the processes is run multiple times on the same or similar inputs, at step 218.

If it is determined at step 210 that revealing the iteration conditional would not subvert higher level security goals, a minimum (e.g., fewer than the maximum) number of iterations is run under MPC (e.g., the minimum number of iterations being a number of iterations sufficient for the localization algorithm to converge to an acceptable error level or threshold) and the conditional is revealed to network resources, at step 220. Conversely, if it is determined at step 210 that revealing the iteration conditional would subvert higher level security goals, the method proceeds to step 225 and the maximum number of iterations is run under MPC and the conditional is kept secret.

Figure 3:
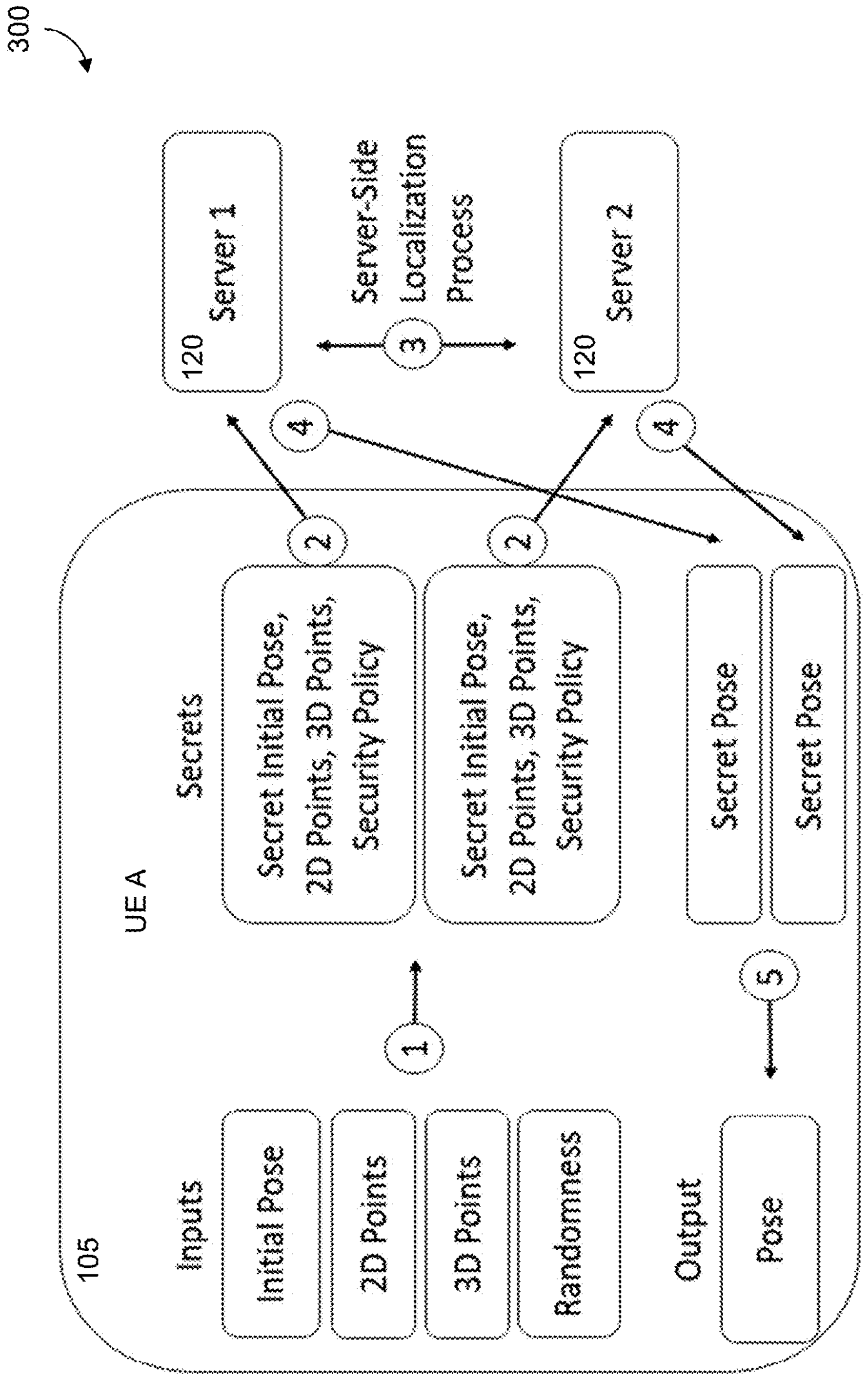
FIG. 3 illustrates an example device-side method for preparing inputs for offloading localization using privacy preserving techniques, according to certain embodiments.

FIG. 3 illustrates an example device-side method 300 for preparing inputs for offloading localization using privacy preserving techniques, according to certain embodiments. As shown in FIG. 1, inputs may include an initial pose, one or more two-dimensional (2D) points, one or more three-dimensional (3D) points, and some randomness. Based on the randomness, the device 105 generates, at step 1, multiple different versions of the secret initial pose, 2D points, 3D points, and a security policy. This information, as well as a security policy is transmitted, at step 2, to network resources $E_1$ and $E_2$ 120, which are depicted in FIG. 3 as servers 1 and servers 2. Thus, each of the servers 120 receive a different version of the inputs. The servers then individually perform the serer-side localization process, at step 3.

At step 4, the servers 120 send the outputs from the server-side localization process to the device 105. In the illustrated example, the outputs are secret poses, which are used to generate an output pose at step 5.

Figure 4:
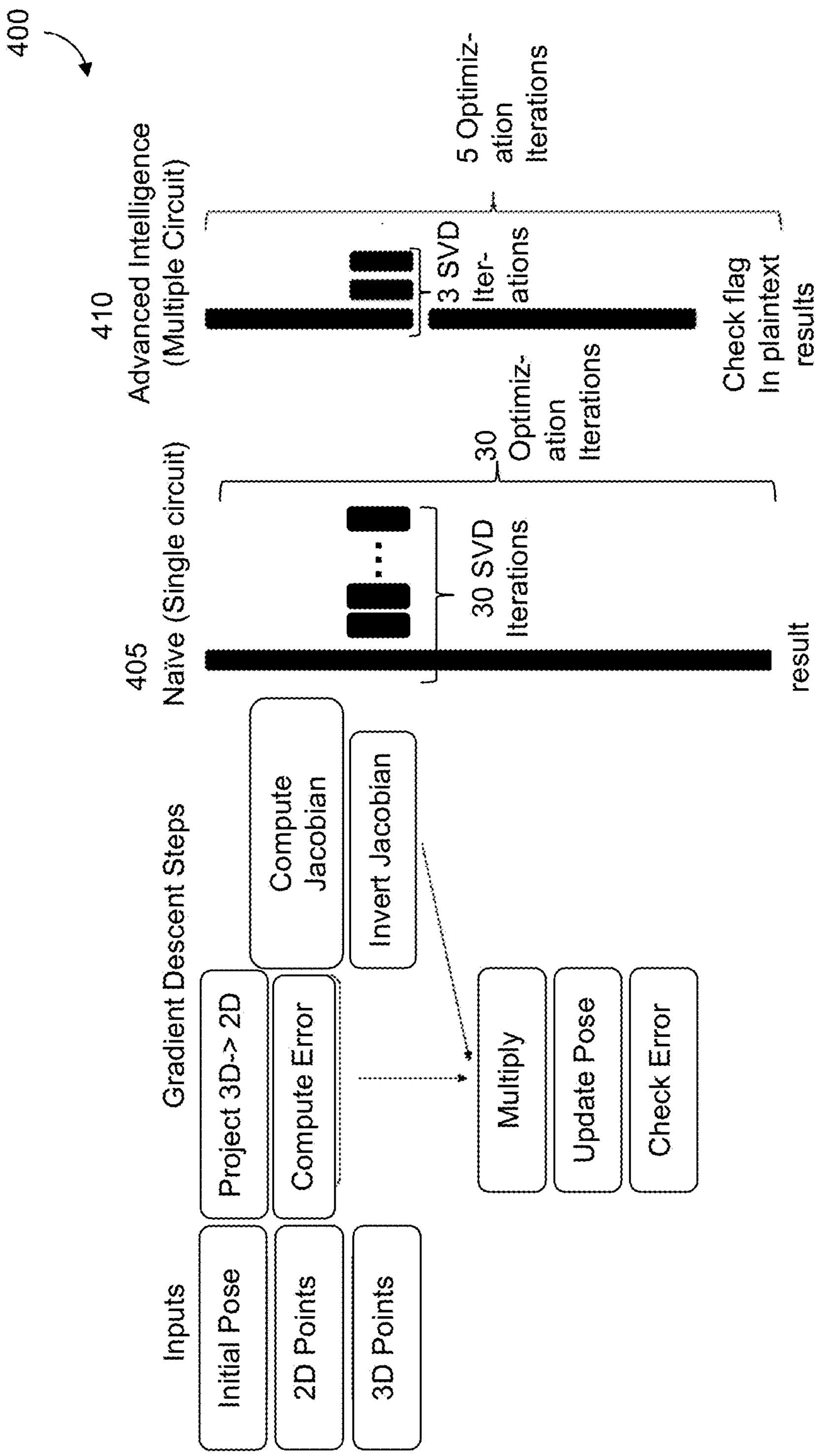
FIG. 4 illustrates server-side methods for performing the localization process, according to certain embodiments.

FIG. 4 illustrates server-side methods 400 for performing the localization process, according to certain embodiments. Specifically, method 400 illustrates the differences between prior techniques for performing offloaded localization process, which is shown in the naïve, single circuit design 405, with new techniques that include advanced intelligence using a multiple circuit design 410. As used herein, the naïve, single circuit design includes any arbitrary localization process under the standard assumptions associated with MPC. As shown, the common upper bound of iterations is 30 for both Singular Value Decomposition (SVD) and an optimization process such as, for example, Gradient Descent (GD), a Gauss Newton optimization, a Levenberg Marquardt optimization, or any other suitable optimization process, of the naïve circuit design 405, while the multiple circuit design 410 includes algorithms for terminating process early after fewer iterations. Specifically, in the example depicted in FIG. 4, the multiple circuit design 410 terminates the process after 3 SVD iterations and 5 optimization process iterations.

According to certain embodiments, localization steps are taken by network resources $E_1$ and $E_2$ 120 and are described at the level of digital logic using AND and XOR gates making up circuits to be run under MPC.

As described above, the inputs may include an initial pose, one or more 2D points, and one or more 3D points. In certain embodiments, the depicted inputs have already been secret shared. Thus, network resources $E_1$ and $E_2$ 120 do not have access to plaintext data.

The two circuit designs are described in more detail below.

Naïve (Single Circuit Design)

A naïve adaptation of a localization process under a given MPC protocol would introduce a single circuit conducting a fixed upper bound of gradient descent and SVD iterations. This prevents disclosing the number of iterations necessary to localize in a given environment as this information could reveal the quality of the initial pose estimate or complexity of the localization environment. Doing so is required because flow control of MPC programs cannot depend on secrets, otherwise values of secret data could be inferred by observing which program paths are taken. While keeping all information secret is a security requirement under very strict assumptions, it generates a critical efficiency failure for iterative algorithms like gradient descent and the SVD. Specifically, the algorithms must run the maximum number of iterations regardless of how quickly the algorithm converges, meaning that this algorithm does not stop in the single-circuit iteration when the maximum number of iterations is reached to prevent the circuit from releasing information about the process.

Additional Intelligence (Multiple Circuit Design)

Certain embodiments described herein reveal intermediate information to network resources when performing localization. Determining which intermediate information is acceptable to leak (in plaintext) to network resources for the sake of efficiency is non-trivial as it requires careful analysis of the localization processes and adoption to running under MPC. As highlighted below in the sequence overview; Boolean flags may be released in plaintext to the network attached servers. These flags signify whether an iterative subprocess within the localization algorithm is complete or if further iterations must be run. The limited release of private information, described in detail below, has been determined to significantly improve performance, while not subverting the security goals of privacy preserving localization.

The implementation details of how plaintext data is revealed to network servers depends on the specific MPC protocol and framework used. Modifications are not proposed to the MPC mechanism. Rather, embodiments described herein focus on which information can be safely revealed, specifically in the context of localization as shown in FIG. 3.

With the proposed methods and systems, how much information is revealed does not change dynamically depending on input data. Instead, the information that can be safely revealed is determined a priori and statically.

It may be recognized that not all MPC protocols allow revealing intermediate data. Some protocols require an MPC circuit to be fully evaluated before revealing its output. Accordingly, certain embodiments break the localization circuit into multiple subcircuits. Plaintext data is revealed between circuits and secret data is passed between circuits.

According to certain embodiments, the steps performed for the offloading of the localization process may include the following:

1. Device processes localization input data for offloading.
   a. Sensors capture data from environment (ex. RGB image.)
   b. Device converts sensor input into data format required for localization processing.
2. Prepare encrypted data packets for network resources $E_1, E_2, \ldots E_n$
   a. Identify private information
   b. Split secret input features into n secret shares where n is the number of network resources involved in offloaded computation
   c. [Extension] Device may operate as "crypto-oracle"—generates cryptographic triples required for MPC
3. Offload split data packets to network resources
4. Network resources conduct computation as directed in data packets
   a. Resources decrypt packets and perform operations delineated in the data packet under the specified MPC protocol
   b. Resources encrypt results to send back to device
5. Network resources return encrypted results to device
6. Device uses combined results from n network resources to complete localization These steps are described in more detail below.

Device Processes Localization Input Data for Offloading

According to certain embodiments, device A 105 conducts requisite pre-offloading sensing and desired amount of pre-localization processing before offloading to network resources using one or more of the following processes:

Device Processes Relevant Inputs Used in the Localization Process

These inputs take the form of 2D inputs-traditionally one or more RGB images—each of which is one view of the 3D map in which the device is localizing. The goal is to estimate the position and orientation of the device A 105 within the 3D map of its environment using the 2D information.

Device Converts Sensor Input into Data Format Required for Localization Processing.

Device 105 extracts features from raw sensor input. These features are then matched with their corresponding 3D features in the environment map, for example using the popular Oriented fast and Rotated Brief (ORB) approach. The device A 105 may first choose key frames on which to extract features or may run on every frame captured. The device 105 may also perform tasks to improve input quality, for example using the popular Random Sample Consensus (RANSAC) approach.

Prepare Data Packets for Network Resources $E_1, \ldots E_n$

According to certain embodiments, the device A 105 prepares a data packet with the following information:

The requisite input data necessary to perform localization. Data designated as private information must be split into n pieces for processing under MPC, where n corresponds to the number of network resources to which localization tasks are being offloaded.

Security policy and metadata specifying the series of operations to be executed under MPC and in which protocol and security model. This method is flexible to the MPC protocol or security model to be used, as any complete MPC protocol operates within this method's constraints.

This process is described in greater detail below.

Identify Private Information

In a particular embodiment, device A 105 sends secret shares of feature locations (x, y) extracted from 2D inputs as well as their corresponding 3D feature locations (x, y, z) to network resources. Device A 105 may choose to send camera parameters used in localization, e.g. focal length and principal point, as either secrets shares or plaintext data, depending on whether such information is considered secret. Device A 105 may choose to initialize the location with a gross estimate of its position, which again may be considered secret or public depending on device policy.

Split Secret Input Information into n Secret Shares, where n is the Number of Network Resources Participating in Offloaded Computation In a particular embodiment, device A 105 prepares secret information for computation by network-connected resources. Splitting the secret input data into secret shares is required to conduct operations under MPC across two or more network-connected resources. The following represents one implementation of secret sharing—an implementation that is likely to be used, and is used by the authors in trial implementation-due to its simplicity without sacrificing security:

Device A 105 samples random value used to split plaintext data into n parts such that when some threshold t (where t<=n) parts (determined by user) are combined (XORed) together the result is the plaintext data.

Device May Operate as "Crypto-Oracle"—Generates Cryptographic Triples Required for MPC In a particular embodiment, device A 105 may act with oracular knowledge to accelerate MPC protocol performance by precomputing ciphertext consumed during MPC protocol execution by network-attached resources.

Modern MPC protocols consume ciphertext as they run. This ciphertext is either precomputed by MPC participants (in our case network resources) or generated on the fly. More concretely, this ciphertext is either multiplication triples or oblivious transfer primitives. Which ciphertext is used depends on which specific MPC protocol is employed, thus, to be generic we use the word ciphertext to refer to either. This ciphertext is expensive to generate because it requires running a subprotocol between all MPC participants.

Certain embodiments described herein, however, obviate the need to run such protocols. Since all data is owned by one party, the device, they may generate the ciphertext with oracular knowledge, themselves, which is much more efficient than running a protocol between all MPC participants. This is made possible by observing that any curious (semi-honest) or malicious behavior on behalf of the device will do no more than compromise the security of their own secrets. In other words, if the device attempts to cheat when generating ciphertext consumed by network resources, the network resources can learn the device's secrets.

According to certain embodiments, the steps for a device A 105 to pre-compute ciphertext as a cryptographic oracle are as follows:

1. Device A 105 computes required primitives for the chosen MPC protocol. In practice this is often either multiplication triples or base oblivious transfers. In the case of multiplication triples, the device computes secret shares of a triple of {a,b,c} plaintext values where a*b=c. In the case oblivious transfer, the device A 105 may use any known process. As such, material computed depends on how many network resources will participate in the MPC protocol.
   a. Device A 105 may generate all, none, or a fraction of required ciphertext for a designated subset of operations in order to optimize on-device resource consumption and MPC performance efficiency.
2. Device A 105 computes ciphertext in accordance to this protocol on-device in the pre-computation stage, potentially well in advance of localization process if protocol is known in advance.
3. Device A 105 sends generated ciphertext to each of the designated network resources in the offload step of this method.

In a particular embodiment, device A 105 may choose whether to perform the task of generating ciphertext on behalf of the network resources as doing so requires expending resources on-device. The motivation for offloading localization is to conserve on-device resources while the process described here brings work back onto the device A 105. It is believed that this process is still valuable as it may present a middle ground between onboard and fully offloaded localization, a tradeoff especially valuable considering resource constrained network resources which may not be able to pre-generate required ciphertext, or when the cost of network resources is such that a middle ground is desirable.

Offload Encrypted Split Data Packets to Network Resources

In this step, device A 105 offloads the data packets to the network resources responsible for carrying out the designated operations on the secret-shared data. Device A 105 may encrypt these data packets to prevent the network or any potential intercepting party from intercepting the secret shares.

Network Resources Conduct Computation as Directed by Security Policy and Metadata According to certain embodiments, network resources choose which protocol and in which security model to execute localization, as specified in the policy information sent by the device A 105. For example, in a particular embodiment, network resources may execute one or more of the following steps under MPC:

Build one MPC circuit per gradient decent iteration. An iteration consists of:

a. Project points 3D points to 2D image plane based on pose estimate
b. Compute the Jacobian matrix of point projection numerically by adding a small perturbation to each dimension of the pose, reprojecting the 3D points, and measuring their offset from the original projection.
c. Calculate the error between 3D point projection and the measured 2D points.
d. Compute the pseudoinverse of the Jacobian matrix using SVD. Computing the SVD of a matrix is done by a Householder transformation to compute a bidiagonal matrix, then QR transformation. Here, our work differs from a naïve implementation. The QR transformation is an iterative process and allows for early break conditions if revealed in plaintext. We take advantage of the early break conditions by splitting the SVD process into steps and revealing the following break conditions to network-connected resources:

i. Condition of the Jacobian matrix (how many non-zero singular values exist) otherwise known as the rank of the matrix. In the context of localization, the condition number is usually six as there are six degrees of freedom in the camera pose. If the device were to perform localization in pathological cases (for example when all 3D points are linear or planar) the network-connected resources learn the degree of the range of the Jacobian.

ii. The number of non-zero elements in bidiagonal form (an intermediate representation of the singular values) is also learned by the network-connected resource with the same implications described above in i.

e. Multiply the pseudoinverse of the Jacobian matrix by the error computed in step c to compute the pose update.

f. Update the pose estimate using the pose update computed in step e.

g. If the error computed in step c is below a predetermined threshold, halt. Otherwise, start back at step a using the updated pose estimate computed in step f. Our work differs from the naïve implementation in this step as the following information is revealed in plaintext:

i. A Boolean flag is revealed in plaintext to network attached resources signifying if the algorithm has converged. If the algorithm has converged, the secret shared pose can be returned to the device. If not, more iterations are required. Without releasing this information, running under MPC requires running a fixed upper bound of iterations to guarantee convergence.

Network Resources Return Encrypted Result to Device

Network resources send the results of their computation in encrypted data packets to the device. Various methods of encryption are known in the art and may be used to return the encrypted result to the device A 105.

Device Decrypts and Uses Combined Results from Network Resources to Complete Localization Device A 105 decrypts results from network attached resources, then combines the data from each according to the secret sharing protocol used. From this, device 105 learns its pose within the captured environment.

Figure 5:
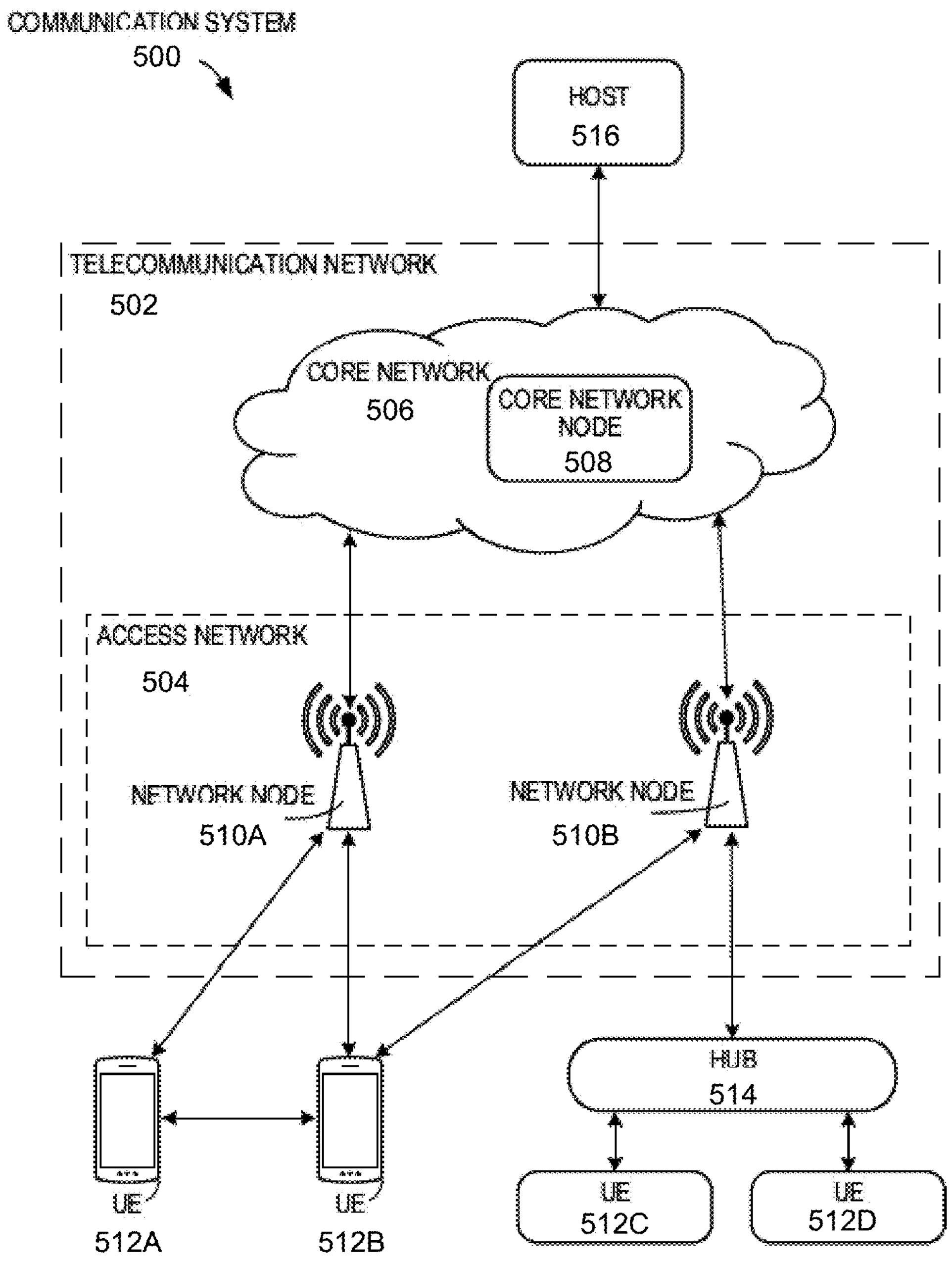
FIG. 5 illustrates an example communication system, according to certain embodiments.

FIG. 5 shows an example of a communication system 500 in accordance with some embodiments. In the example, the communication system 500 includes a telecommunication network 502 that includes an access network 504, such as a radio access network (RAN), and a core network 506, which includes one or more core network nodes 508. The access network 504 includes one or more access network nodes, such as network nodes 510*a* and 510*b* (one or more of which may be generally referred to as network nodes 510), or any other similar 3rd Generation Partnership Project (3GPP) access node or non-3GPP access point. The network nodes 510 facilitate direct or indirect connection of user equipment (UE), such as by connecting UEs 512*a*, 512*b*, 512*c*, and 512*d* (one or more of which may be generally referred to as UEs 512) to the core network 506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 500 may include any number of wired or wireless networks, network nodes, UEs, and/or any other components or systems that may facilitate or participate in the communication of data and/or signals whether via wired or wireless connections. The communication system 500 may include and/or interface with any type of communication, telecommunication, data, cellular, radio network, and/or other similar type of system.

The UEs 512 may be any of a wide variety of communication devices, including wireless devices arranged, configured, and/or operable to communicate wirelessly with the network nodes 510 and other communication devices. Similarly, the network nodes 510 are arranged, capable, configured, and/or operable to communicate directly or indirectly with the UEs 512 and/or with other network nodes or equipment in the telecommunication network 502 to enable and/or provide network access, such as wireless network access, and/or to perform other functions, such as administration in the telecommunication network 502.

In the depicted example, the core network 506 connects the network nodes 510 to one or more hosts, such as host 516. These connections may be direct or indirect via one or more intermediary networks or devices. In other examples, network nodes may be directly coupled to hosts. The core network 506 includes one more core network nodes (e.g., core network node 508) that are structured with hardware and software components. Features of these components may be substantially similar to those described with respect to the UEs, network nodes, and/or hosts, such that the descriptions thereof are generally applicable to the corresponding components of the core network node 508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 516 may be under the ownership or control of a service provider other than an operator or provider of the access network 504 and/or the telecommunication network 502, and may be operated by the service provider or on behalf of the service provider. The host 516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 500 of FIG. 5 enables connectivity between the UEs, network nodes, and hosts. In that sense, the communication system may be configured to operate according to predefined rules or procedures, such as specific standards that include, but are not limited to: Global System for Mobile Communications (GSM): Universal Mobile Telecommunications System (UMTS): Long Term Evolution (LTE), and/or other suitable 2G. 3G, 4G, 5G standards, or any applicable future generation standard (e.g., 6G): wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 502 is a cellular network that implements 3GPP standardized features. Accordingly, the telecommunications network 502 may support network slicing to provide different logical networks to different devices that are connected to the telecommunication network 502. For example, the telecommunications network 502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 512 are configured to transmit and/or receive information without direct human interaction. For instance, a UE may be designed to transmit information to the access network 504 on a predetermined schedule, when triggered by an internal or external event, or in response to requests from the access network 504. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 514 communicates with the access network 504 to facilitate indirect communication between one or more UEs (e.g., UE 512*c* and/or 512*d*) and network nodes (e.g., network node 510*b*). In some examples, the hub 514 may be a controller, router, content source and analytics, or any of the other communication devices described herein regarding UEs. For example, the hub 514 may be a broadband router enabling access to the core network 506 for the UEs. As another example, the hub 514 may be a controller that sends commands or instructions to one or more actuators in the UEs. Commands or instructions may be received from the UEs, network nodes 510, or by executable code, script, process, or other instructions in the hub 514. As another example, the hub 514 may be a data collector that acts as temporary storage for UE data and, in some embodiments, may perform analysis or other processing of the data. As another example, the hub 514 may be a content source. For example, for a UE that is a VR headset, display, loudspeaker or other media delivery device, the hub 514 may retrieve VR assets, video, audio, or other media or data related to sensory information via a network node, which the hub 514 then provides to the UE either directly, after performing local processing, and/or after adding additional local content. In still another example, the hub 514 acts as a proxy server or orchestrator for the UEs, in particular in if one or more of the UEs are low energy IoT devices.

The hub 514 may have a constant/persistent or intermittent connection to the network node 510*b*. The hub 514 may also allow for a different communication scheme and/or schedule between the hub 514 and UEs (e.g., UE 512*c* and/or 512*d*), and between the hub 514 and the core network 506. In other examples, the hub 514 is connected to the core network 506 and/or one or more UEs via a wired connection. Moreover, the hub 514 may be configured to connect to an M2M service provider over the access network 504 and/or to another UE over a direct connection. In some scenarios, UEs may establish a wireless connection with the network nodes 510 while still connected via the hub 514 via a wired or wireless connection. In some embodiments, the hub 514 may be a dedicated hub—that is, a hub whose primary function is to route communications to/from the UEs from/to the network node 510*b*. In other embodiments, the hub 514 may be a non-dedicated hub—that is, a device which is capable of operating to route communications between the UEs and network node 510*b*, but which is additionally capable of operating as a communication start and/or end point for certain data channels.

Figure 6:
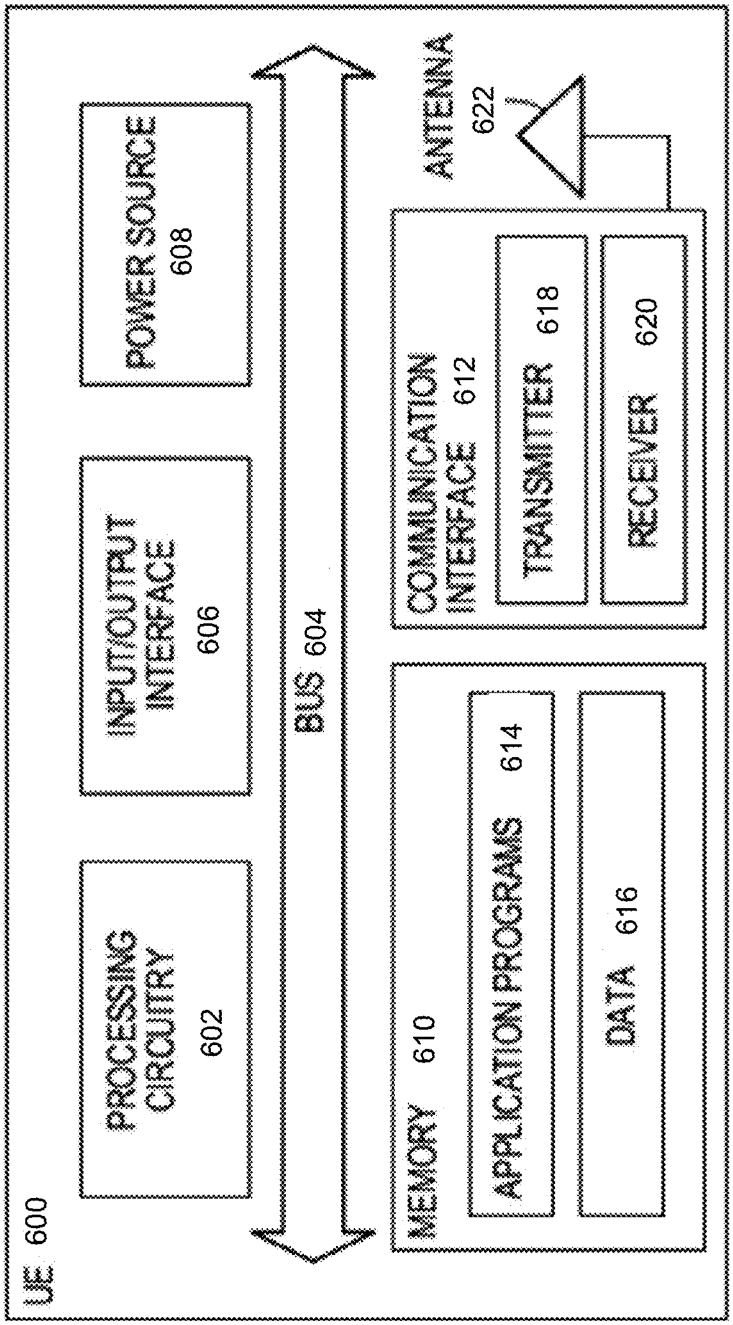
FIG. 6 illustrates an example UE, according to certain embodiments.

FIG. 6 shows a UE 600 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 600 includes processing circuitry 602 that is operatively coupled via a bus 604 to an input/output interface 606, a power source 608, a memory 610, a communication interface 612, and/or any other component, or any combination thereof. Certain UEs may utilize all or a subset of the components shown in FIG. 6. The level of integration between the components may vary from one UE to another UE. Further, certain UEs may contain multiple instances of a component, such as multiple processors, memories, transceivers, transmitters, receivers, etc.

The processing circuitry 602 is configured to process instructions and data and may be configured to implement any sequential state machine operative to execute instructions stored as machine-readable computer programs in the memory 610. The processing circuitry 602 may be implemented as one or more hardware-implemented state machines (e.g., in discrete logic, field-programmable gate arrays (FPGAs), application specific integrated circuits (ASICs), etc.); programmable logic together with appropriate firmware: one or more stored computer programs, general-purpose processors, such as a microprocessor or digital signal processor (DSP), together with appropriate software:

or any combination of the above. For example, the processing circuitry 602 may include multiple central processing units (CPUs).

In the example, the input/output interface 606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 608 is structured as a battery or battery pack. Other types of power sources, such as an external power source (e.g., an electricity outlet), photovoltaic device, or power cell, may be used. The power source 608 may further include power circuitry for delivering power from the power source 608 itself, and/or an external power source, to the various parts of the UE 600 via input circuitry or an interface such as an electrical power cable. Delivering power may be, for example, for charging of the power source 608. Power circuitry may perform any formatting, converting, or other modification to the power from the power source 608 to make the power suitable for the respective components of the UE 600 to which power is supplied.

The memory 610 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 610 includes one or more application programs 614, such as an operating system, web browser application, a widget, gadget engine, or other application, and corresponding data 616. The memory 610 may store, for use by the UE 600, any of a variety of various operating systems or combinations of operating systems.

The memory 610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 610 may allow the UE 600 to access instructions, application programs and the like, stored on transitory or non-transitory memory media, to off-load data, or to upload data. An article of manufacture, such as one utilizing a communication system may be tangibly embodied as or in the memory 610, which may be or comprise a device-readable storage medium.

The processing circuitry 602 may be configured to communicate with an access network or other network using the communication interface 612. The communication interface 612 may comprise one or more communication subsystems and may include or be communicatively coupled to an antenna 622. The communication interface 612 may include one or more transceivers used to communicate, such as by communicating with one or more remote transceivers of another device capable of wireless communication (e.g., another UE or a network node in an access network). Each transceiver may include a transmitter 618 and/or a receiver 620 appropriate to provide network communications (e.g., optical, electrical, frequency allocations, and so forth). Moreover, the transmitter 618 and receiver 620 may be coupled to one or more antennas (e.g., antenna 622) and may share circuit components, software or firmware, or alternatively be implemented separately.

In the illustrated embodiment, communication functions of the communication interface 612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 600 shown in FIG. 6.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 7:
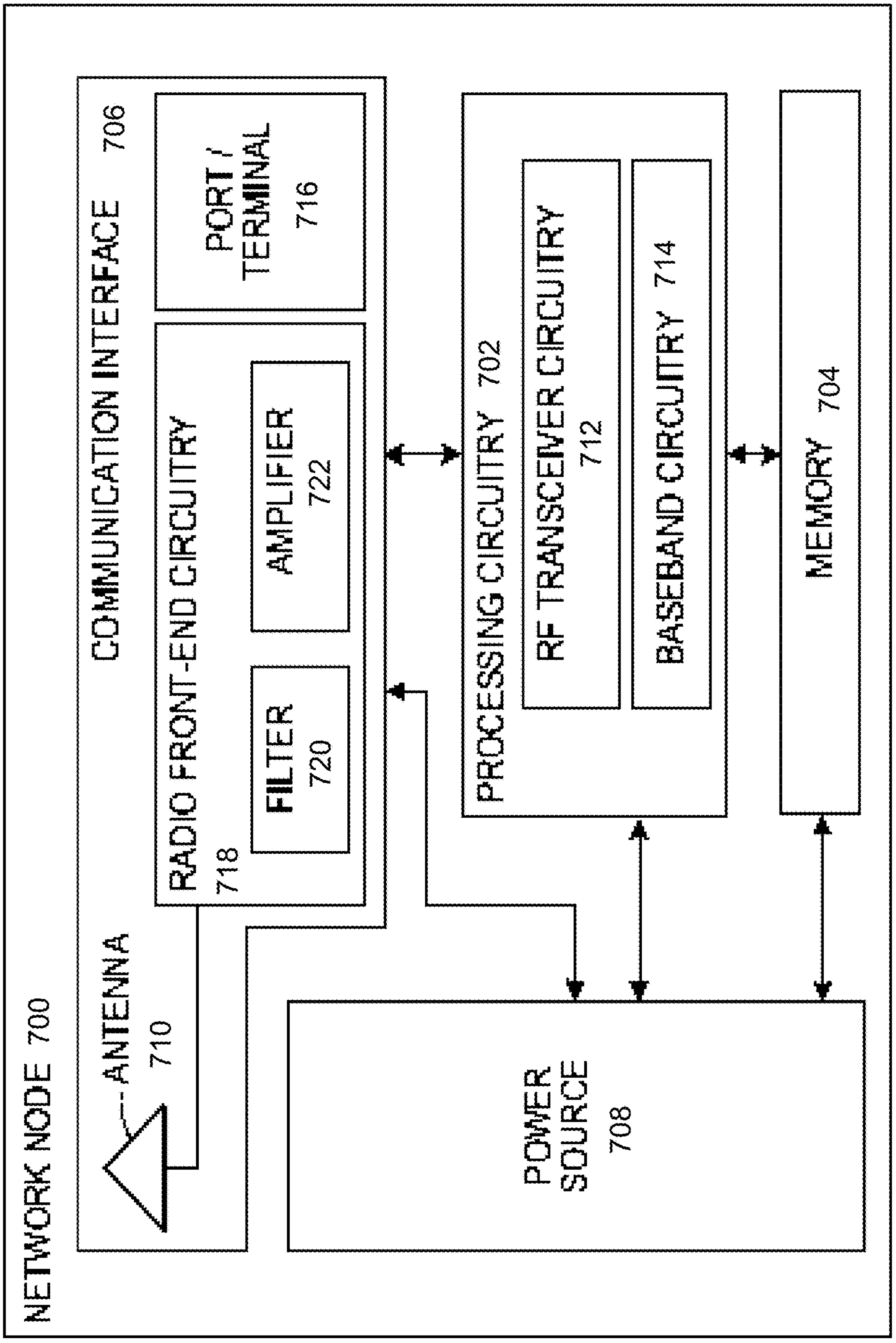
FIG. 7 illustrates an example network node, according to certain embodiments.

FIG. 7 shows a network node 700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 700 includes a processing circuitry 702, a memory 704, a communication interface 706, and a power source 708. The network node 700 may be composed of multiple physically separate components (e.g., a NodeB component and a RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 700 may be configured to support multiple radio access technologies (RATs). In such embodiments, some components may be duplicated (e.g., separate memory 704 for different RATs) and some components may be reused (e.g., a same antenna 710 may be shared by different RATs). The network node 700 may also include multiple sets of the various illustrated components for different wireless technologies integrated into network node 700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 700.

The processing circuitry 702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 700 components, such as the memory 704, to provide network node 700 functionality.

In some embodiments, the processing circuitry 702 includes a system on a chip (SOC). In some embodiments, the processing circuitry 702 includes one or more of radio frequency (RF) transceiver circuitry 712 and baseband processing circuitry 714. In some embodiments, the radio frequency (RF) transceiver circuitry 712 and the baseband processing circuitry 714 may be on separate chips (or sets of chips), boards, or units, such as radio units and digital units. In alternative embodiments, part or all of RF transceiver circuitry 712 and baseband processing circuitry 714 may be on the same chip or set of chips, boards, or units.

The memory 704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 702. The memory 704 may store any suitable instructions, data, or information, including a computer program, software, an application including one or more of logic, rules, code, tables, and/or other instructions capable of being executed by the processing circuitry 702 and utilized by the network node 700. The memory 704 may be used to store any calculations made by the processing circuitry 702 and/or any data received via the communication interface 706. In some embodiments, the processing circuitry 702 and memory 704 is integrated.

The communication interface 706 is used in wired or wireless communication of signaling and/or data between a network node, access network, and/or UE. As illustrated, the communication interface 706 comprises port(s)/terminal(s) 716 to send and receive data, for example to and from a network over a wired connection. The communication interface 706 also includes radio front-end circuitry 718 that may be coupled to, or in certain embodiments a part of, the antenna 710. Radio front-end circuitry 718 comprises filters 720 and amplifiers 722. The radio front-end circuitry 718 may be connected to an antenna 710 and processing circuitry 702. The radio front-end circuitry may be configured to condition signals communicated between antenna 710 and processing circuitry 702. The radio front-end circuitry 718 may receive digital data that is to be sent out to other network nodes or UEs via a wireless connection. The radio front-end circuitry 718 may convert the digital data into a radio signal having the appropriate channel and bandwidth parameters using a combination of filters 720 and/or amplifiers 722. The radio signal may then be transmitted via the antenna 710. Similarly, when receiving data, the antenna 710) may collect radio signals which are then converted into digital data by the radio front-end circuitry 718. The digital data may be passed to the processing circuitry 702. In other embodiments, the communication interface may comprise different components and/or different combinations of components.

In certain alternative embodiments, the network node 700 does not include separate radio front-end circuitry 718, instead, the processing circuitry 702 includes radio front-end circuitry and is connected to the antenna 710. Similarly, in some embodiments, all or some of the RF transceiver circuitry 712 is part of the communication interface 706. In still other embodiments, the communication interface 706 includes one or more ports or terminals 716, the radio front-end circuitry 718, and the RF transceiver circuitry 712, as part of a radio unit (not shown), and the communication interface 706 communicates with the baseband processing circuitry 714, which is part of a digital unit (not shown).

The antenna 710 may include one or more antennas, or antenna arrays, configured to send and/or receive wireless signals. The antenna 710 may be coupled to the radio front-end circuitry 718 and may be any type of antenna capable of transmitting and receiving data and/or signals wirelessly. In certain embodiments, the antenna 710 is separate from the network node 700 and connectable to the network node 700 through an interface or port.

The antenna 710, communication interface 706, and/or the processing circuitry 702 may be configured to perform any receiving operations and/or certain obtaining operations described herein as being performed by the network node. Any information, data and/or signals may be received from a UE, another network node and/or any other network equipment. Similarly, the antenna 710, the communication interface 706, and/or the processing circuitry 702 may be configured to perform any transmitting operations described herein as being performed by the network node. Any information, data and/or signals may be transmitted to a UE, another network node and/or any other network equipment.

The power source 708 provides power to the various components of network node 700 in a form suitable for the respective components (e.g., at a voltage and current level needed for each respective component). The power source 708 may further comprise, or be coupled to, power management circuitry to supply the components of the network node 700 with power for performing the functionality described herein. For example, the network node 700 may be connectable to an external power source (e.g., the power grid, an electricity outlet) via an input circuitry or interface such as an electrical cable, whereby the external power source supplies power to power circuitry of the power source 708. As a further example, the power source 708 may comprise a source of power in the form of a battery or battery pack which is connected to, or integrated in, power circuitry. The battery may provide backup power should the external power source fail.

Embodiments of the network node 700 may include additional components beyond those shown in FIG. 7 for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700.

Figure 8:
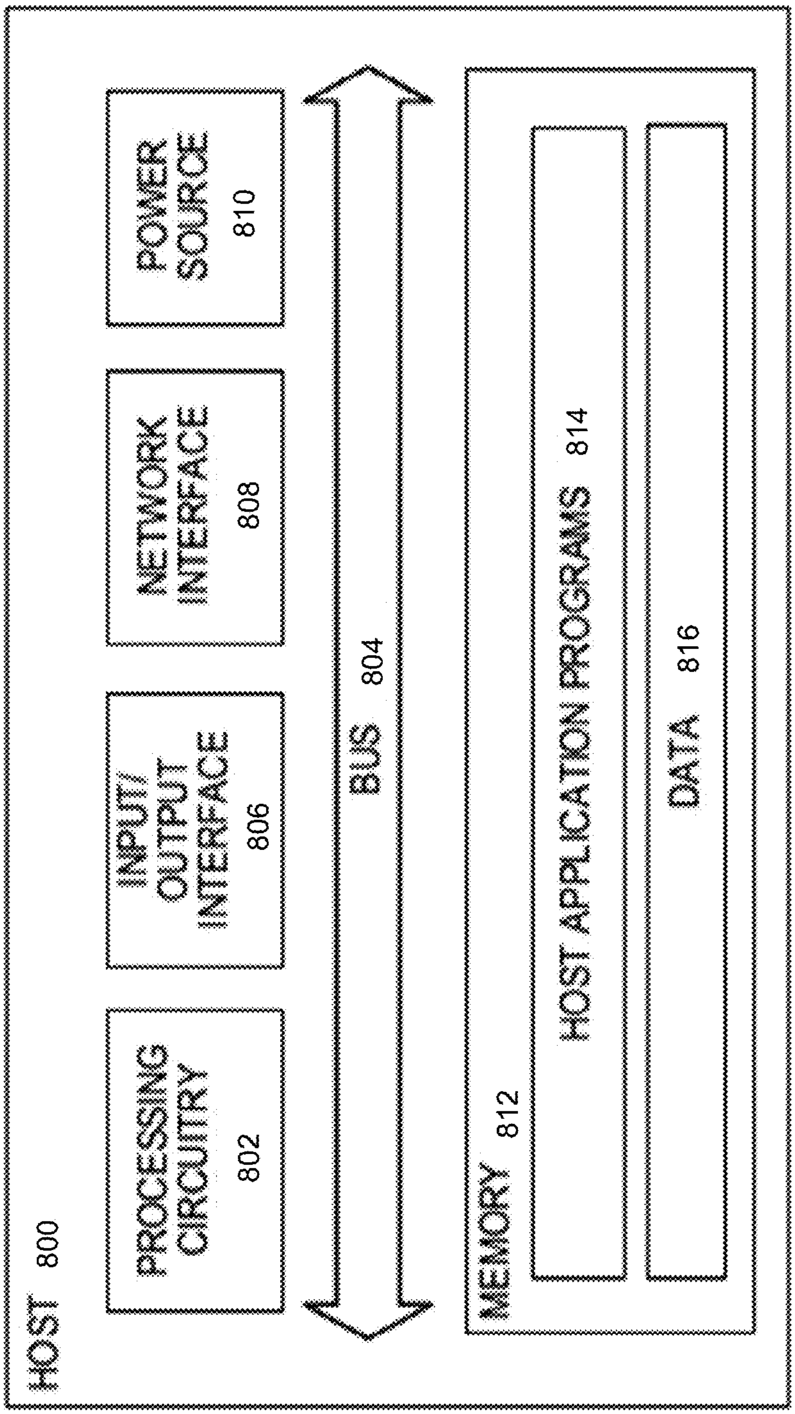
FIG. 8 illustrates a block diagram of a host, according to certain embodiments.

FIG. 8 is a block diagram of a host 800, which may be an embodiment of the host 516 of FIG. 5, in accordance with various aspects described herein.

As used herein, the host 800 may be or comprise various combinations hardware and/or software, including a standalone server, a blade server, a cloud-implemented server, a distributed server, a virtual machine, container, or processing resources in a server farm. The host 800 may provide one or more services to one or more UEs.

The host 800 includes processing circuitry 802 that is operatively coupled via a bus 804 to an input/output interface 806, a network interface 808, a power source 810, and a memory 812. Other components may be included in other embodiments. Features of these components may be substantially similar to those described with respect to the devices of previous figures, such as FIGS. 6 and 7, such that the descriptions thereof are generally applicable to the corresponding components of host 800.

The memory 812 may include one or more computer programs including one or more host application programs 814 and data 816, which may include user data, e.g., data generated by a UE for the host 800 or data generated by the host 800 for a UE. Embodiments of the host 800 may utilize only a subset or all of the components shown. The host application programs 814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 814 may also provide for user authentication and licensing checks and may periodically report health, routes, and content availability to a central node, such as a device in or on the edge of a core network. Accordingly, the host 800 may select and/or indicate a different host for over-the-top services for a UE. The host application programs 814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 9:
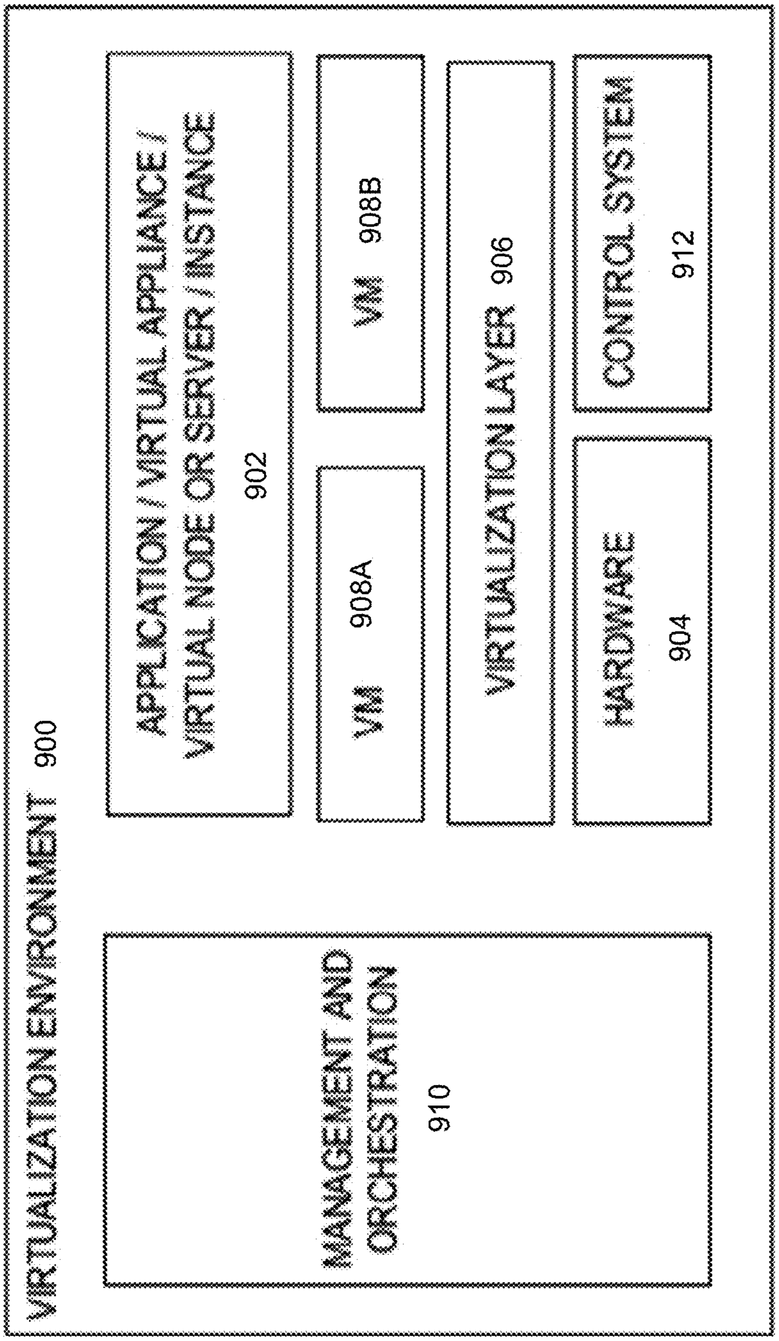
FIG. 9 illustrates a virtualization environment in which functions implemented by some embodiments may be virtualized, according to certain embodiments.

FIG. 9 is a block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 904 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 906 (also referred to as hypervisors or virtual machine monitors (VMMs)), provide VMs 908*a* and 908*b* (one or more of which may be generally referred to as VMs 908), and/or perform any of the functions, features and/or benefits described in relation with some embodiments described herein. The virtualization layer 906 may present a virtual operating platform that appears like networking hardware to the VMs 908.

The VMs 908 comprise virtual processing, virtual memory, virtual networking or interface and virtual storage, and may be run by a corresponding virtualization layer 906. Different embodiments of the instance of a virtual appliance 902 may be implemented on one or more of VMs 908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 908 may be a software implementation of a physical machine that runs programs as if they were executing on a physical, non-virtualized machine. Each of the VMs 908, and that part of hardware 904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 908 on top of the hardware 904 and corresponds to the application 902.

Hardware 904 may be implemented in a standalone network node with generic or specific components. Hardware 904 may implement some functions via virtualization. Alternatively, hardware 904 may be part of a larger cluster of hardware (e.g. such as in a data center or CPE) where many hardware nodes work together and are managed via management and orchestration 910, which, among others, oversees lifecycle management of applications 902. In some embodiments, hardware 904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 912 which may alternatively be used for communication between hardware nodes and radio units.

Figure 10:
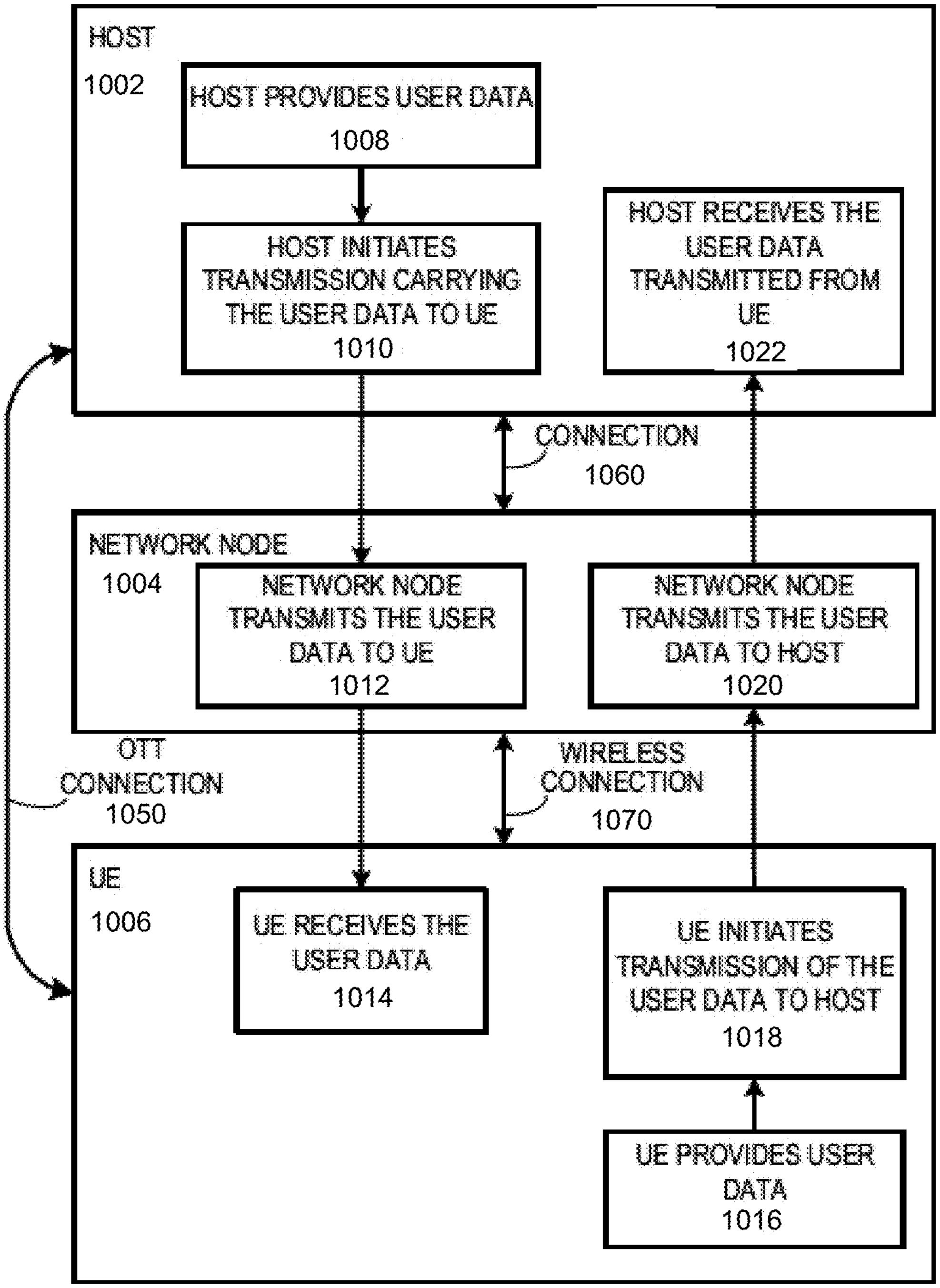
FIG. 10 illustrates a host communicating via a network node with a UE over a partially wireless connection, according to certain embodiments.

FIG. 10 shows a communication diagram of a host 1002 communicating via a network node 1004 with a UE 1006 over a partially wireless connection in accordance with some embodiments. Example implementations, in accordance with various embodiments, of the UE (such as a UE 512*a* of FIG. 5 and/or UE 600 of FIG. 6), network node (such as network node 510*a* of FIG. 5 and/or network node 700 of FIG. 7), and host (such as host 516 of FIG. 5 and/or host 800 of FIG. 8) discussed in the preceding paragraphs will now be described with reference to FIG. 10.

Like host 800, embodiments of host 1002 include hardware, such as a communication interface, processing circuitry, and memory. The host 1002 also includes software, which is stored in or accessible by the host 1002 and executable by the processing circuitry. The software includes a host application that may be operable to provide a service to a remote user, such as the UE 1006 connecting via an over-the-top (OTT) connection 1050 extending between the UE 1006 and host 1002. In providing the service to the remote user, a host application may provide user data which is transmitted using the OTT connection 1050.

The network node 1004 includes hardware enabling it to communicate with the host 1002 and UE 1006. The connection 1060 may be direct or pass through a core network (like core network 506 of FIG. 5) and/or one or more other intermediate networks, such as one or more public, private, or hosted networks. For example, an intermediate network may be a backbone network or the Internet.

The UE 1006 includes hardware and software, which is stored in or accessible by UE 1006 and executable by the UE's processing circuitry. The software includes a client application, such as a web browser or operator-specific "app" that may be operable to provide a service to a human or non-human user via UE 1006 with the support of the host 1002. In the host 1002, an executing host application may communicate with the executing client application via the OTT connection 1050 terminating at the UE 1006 and host 1002. In providing the service to the user, the UE's client application may receive request data from the host's host application and provide user data in response to the request data. The OTT connection 1050 may transfer both the request data and the user data. The UE's client application may interact with the user to generate the user data that it provides to the host application through the OTT connection 1050.

The OTT connection 1050 may extend via a connection 1060 between the host 1002 and the network node 1004 and via a wireless connection 1070 between the network node 1004 and the UE 1006 to provide the connection between the host 1002 and the UE 1006. The connection 1060 and wireless connection 1070, over which the OTT connection 1050 may be provided, have been drawn abstractly to illustrate the communication between the host 1002 and the UE 1006 via the network node 1004, without explicit reference to any intermediary devices and the precise routing of messages via these devices.

As an example of transmitting data via the OTT connection 1050, in step 1008, the host 1002 provides user data, which may be performed by executing a host application. In some embodiments, the user data is associated with a particular human user interacting with the UE 1006. In other embodiments, the user data is associated with a UE 606 that shares data with the host 1002 without explicit human interaction. In step 1010, the host 1002 initiates a transmission carrying the user data towards the UE 1006. The host 1002 may initiate the transmission responsive to a request transmitted by the UE 1006. The request may be caused by human interaction with the UE 1006 or by operation of the client application executing on the UE 1006. The transmission may pass via the network node 1004, in accordance with the teachings of the embodiments described throughout this disclosure. Accordingly, in step 1012, the network node 1004 transmits to the UE 1006 the user data that was carried in the transmission that the host 1002 initiated, in accordance with the teachings of the embodiments described throughout this disclosure. In step 1014, the UE 1006 receives the user data carried in the transmission, which may be performed by a client application executed on the UE 1006 associated with the host application executed by the host 1002.

In some examples, the UE 1006 executes a client application which provides user data to the host 1002. The user data may be provided in reaction or response to the data received from the host 1002. Accordingly, in step 1016, the UE 1006 may provide user data, which may be performed by executing the client application. In providing the user data, the client application may further consider user input received from the user via an input/output interface of the UE 1006. Regardless of the specific manner in which the user data was provided, the UE 1006 initiates, in step 1018, transmission of the user data towards the host 1002 via the network node 1004. In step 1020, in accordance with the teachings of the embodiments described throughout this disclosure, the network node 1004 receives user data from the UE 1006 and initiates transmission of the received user data towards the host 1002. In step 1022, the host 1002 receives the user data carried in the transmission initiated by the UE 1006.

One or more of the various embodiments improve the performance of OTT services provided to the UE 1006 using the OTT connection 1050, in which the wireless connection 1070 forms the last segment. More precisely, the teachings of these embodiments may improve one or more of, for example, data rate, latency, and/or power consumption and, thereby, provide benefits such as, for example, reduced user waiting time, relaxed restriction on file size, improved content resolution, better responsiveness, and/or extended battery lifetime.

In an example scenario, factory status information may be collected and analyzed by the host 1002. As another example, the host 1002 may process audio and video data which may have been retrieved from a UE for use in creating maps. As another example, the host 1002 may collect and analyze real-time data to assist in controlling vehicle congestion (e.g., controlling traffic lights). As another example, the host 1002 may store surveillance video uploaded by a UE. As another example, the host 1002 may store or control access to media content such as video, audio, VR or AR which it can broadcast, multicast or unicast to UEs. As other examples, the host 1002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1050 between the host 1002 and UE 1006, in response to variations in the measurement results. The measurement procedure and/or the network functionality for reconfiguring the OTT connection may be implemented in software and hardware of the host 1002 and/or UE 1006. In some embodiments, sensors (not shown) may be deployed in or in association with other devices through which the OTT connection 1050 passes: the sensors may participate in the measurement procedure by supplying values of the monitored quantities exemplified above, or supplying values of other physical quantities from which software may compute or estimate the monitored quantities. The reconfiguring of the OTT connection 1050 may include message format, retransmission settings, preferred routing etc.: the reconfiguring need not directly alter the operation of the network node 1004. Such procedures and functionalities may be known and practiced in the art. In certain embodiments, measurements may involve proprietary UE signaling that facilitates measurements of throughput, propagation times, latency and the like, by the host 1002. The measurements may be implemented in that software causes messages to be transmitted, in particular empty or 'dummy' messages, using the OTT connection 1050 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Figure 11:
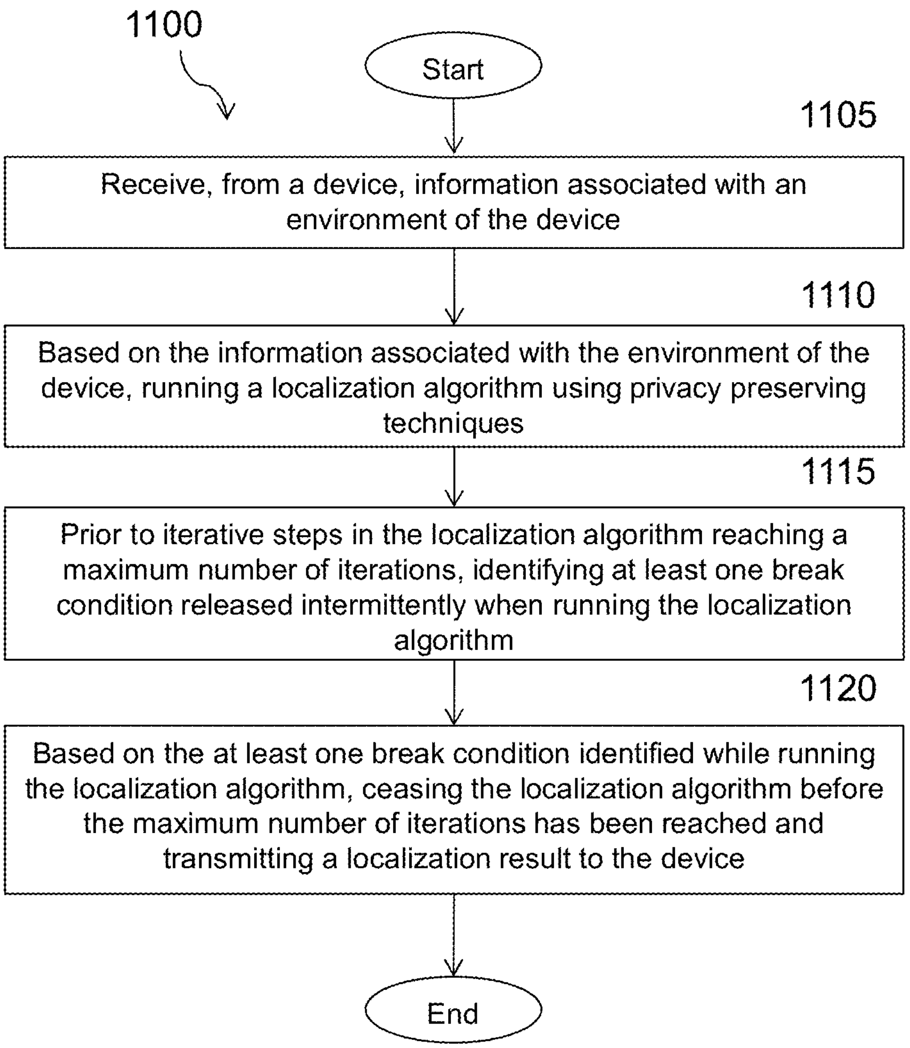
FIG. 11 illustrates a method by a server for improving the performance of iterative localization algorithms run using privacy preserving techniques, according to certain embodiments.

FIG. 11 illustrates a method 1100 by a server 120, 510A-B, 700 for improving the performance of iterative localization algorithms run using privacy preserving techniques, according to certain embodiments. The method begins at step 1105 when the server 120 receives, from a device A 105, information associated with an environment of the device A 105. Based on the information associated with the environment of the device A 105, the server 120 runs a localization algorithm using privacy preserving techniques, at step 1110. Prior to iterative steps in the localization algorithm reaching a maximum number of iterations, the server 120 identifies at least one break condition released intermittently when running the localization algorithm, at step 1115. Based on the at least one break condition identified while running the localization algorithm, the server 120 ceases the localization algorithm before the maximum number of iterations has been reached and transmits a localization result to the device A 105, at step 1120.

As used herein, it may be understood that maximum refers to a full set of iterations that is determined in accordance with a specification or other rule.

The at least one break condition may be considered to be released intermittently where it is released at set intervals during the running of the algorithm. For example, as part of the algorithm, the algorithm may, at set intervals, check to see if an error value associated with a particular iteration is at or below a threshold value (or otherwise at or within an acceptable range or value) (this may otherwise be referred to as the localization algorithm converging). The outcome of the determination may be indicated to the server 120.

In a particular embodiment, when identifying the at least one break condition, the server 120 identifies a flag in the localization algorithm. For example, the flag may indicate whether error value associated with the particular iteration is at or below a threshold value. In a further particular embodiment, the flag may include plain text.

In a particular embodiment, the server 120 determines whether the at least one break condition reveals a characteristic comprising at least one of: at least a portion of an input to the localization algorithm: all of an input to the localization algorithm: a relative distance between two or more inputs to the localization algorithm: a correlation between two or more inputs to the localization algorithm; and a distance between a localization output and an initial pose estimate. In a further particular embodiment, the characteristic is revealed when the localization algorithm is run multiple items on a same input.

In a particular embodiment, the server 120 receives an indication that indicates to the server 120 that the localization algorithm is permitted to be stopped prior to running the maximum number of iterations. The break condition corresponds to the localization algorithm converging to an acceptable error value (e.g., a computed error satisfying a threshold), for example. In a further particular embodiment, the indication is received with the information.

In a particular embodiment, the information comprises confidential and/or private information associated with the environment of the device A 105. In a further particular embodiment, the confidential information is a first secret share of a plurality of secret shares, and the plurality of secret shares other than the first secret share are not shared with the server. For example, other servers or network resources may receive one or more of the shares other than the first secret for similar optimization processing.

In a particular embodiment, the server 120 performs the localization algorithm using a secure MPC protocol. Other privacy preserving computing protocols can be used.

In a particular embodiment, the environment comprises a three-dimensional space in which the device A 105 is located, and the information comprises at least one element or feature associated with the three-dimensional space.

In a particular embodiment, the information comprises at least one of: one or more 2D points: one or more 3D points: a security policy: camera parameters associated with the device A 105; and sensor parameters associated with the device A 105.

In a particular embodiment, the localization algorithm comprises iterative computational steps that include at least one of: computing a SVD: computing a GD; performing a Gauss Newton optimization: performing a Levenberg Marquardt optimization, or performing any other suitable optimization algorithm.

In a particular embodiment, the device A 105 comprises an autonomous robotic device and/or assistive user equipment.

Figure 12:
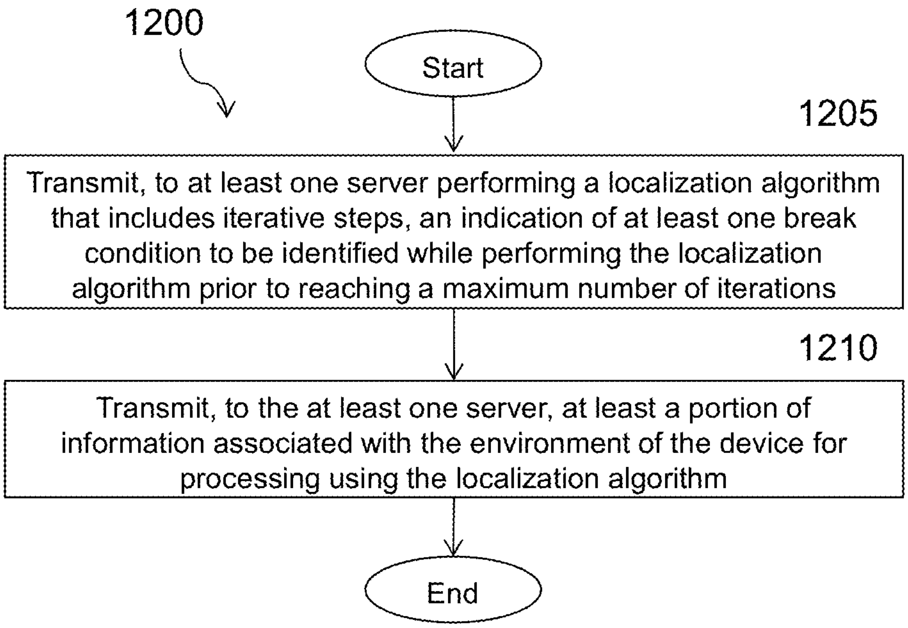
FIG. 12 illustrates a method performed by a device for improving the performance of iterative localization algorithms run using privacy preserving techniques, according to certain embodiments.

FIG. 12 illustrates a method 1200 performed by a device A 105 for improving the performance of iterative localization algorithms run using privacy preserving techniques, according to certain embodiments. The method begins at step 1205 when device A 105 transmits, to at least one server 120 performing a localization algorithm that includes iterative steps, an indication of at least one break condition to be identified while performing the localization algorithm prior to reaching a maximum number of iterations. At step 1210, the device A 105 transmits, to the at least one server 120, at least a portion of information associated with an environment of the device A 105 for processing using the localization algorithm.

In a particular embodiment, the indication is transmitted with the information.

In a particular embodiment, the device A 105 receives, from the at least one server 120, a localization output comprising an estimated of a pose of the device A 105 in the environment.

In a particular embodiment, the at least one break condition comprises a flag in the localization algorithm. In a further particular embodiment, the flag comprises plain text.

In a particular embodiment, prior to transmitting the indication of the at least one break condition, device A 105 determines that the at least one break condition does not reveal a characteristic comprising at least one of: at least a portion of an input to the localization algorithm: all of an input to the localization algorithm: a relative distance between two or more inputs to the localization algorithm: a correlation between two or more inputs to the localization algorithm; and a distance between a localization output and an initial pose estimate. In a further particular embodiment, the characteristic would be revealed when the localization algorithm is run multiple items on a same input.

In a particular embodiment, the information comprises confidential information associated with the environment of the device A 105. In a further particular embodiment, the confidential information is a first secret share of a plurality of secret shares, and wherein the plurality of the secret shares other than the first secret share are not shared with the at least one server 120. In a further particular embodiment, the at least one server 120 performs the localization algorithm using a secure MPC protocol. Thus, device A 105 may send the same or different versions of the secret shares to as many different servers 120 for optimization processes and performance of the localization algorithm, in a particular embodiment.

In a particular embodiment, the environment comprises a 3D space in which the device is located, and the information comprises at least one element or feature associated with the 3D space.

In a particular embodiment, the information comprises at least one of: one or more 2D points: one or more 3D points: a security policy: camera parameters associated with the device A 105; and sensor parameters associated with the device A 105.

In a particular embodiment, the localization algorithm comprises iterative computational steps that include at least one of: computing a SVD; computing a GD; performing a Gauss Newton optimization; performing a Levenberg Marquardt optimization, or performing any other suitable optimization process.

In a particular embodiment, the device A 105 comprises an autonomous robotic device and/or assistive UE.

The invention claimed is:

1. A method by a server for improving the performance of iterative localization algorithms run using privacy preserving techniques, the method comprising:

receiving, from a device, information associated with an environment of the device;

based on the information associated with the environment of the device, running, by the server, a localization algorithm using privacy preserving techniques;

prior to iterative steps in the localization algorithm reaching a maximum number of iterations, identifying, by the server, at least one break condition released intermittently when running the localization algorithm; and based on the at least one break condition identified while running the localization algorithm, ceasing, by the server, the localization algorithm before the maximum number of iterations has been reached and transmitting a localization result to the device.

2. A method by a device for improving the performance of iterative localization algorithms run using privacy preserving techniques, the method comprising:

transmitting, by the device and to at least one server performing a localization algorithm that includes iterative steps, an indication of at least one break condition to be identified while performing the localization algorithm prior to reaching a maximum number of iterations; and transmitting, by the device and to the at least one server, at least a portion of information associated with an environment of the device for processing using the localization algorithm.

3. A server for improving the performance of iterative localization algorithms run using privacy preserving techniques, the server comprising:

memory storing instructions; and processing circuitry operable to execute the instructions to cause the server to:

receive, from a device, information associated with an environment of the device;

based on the information associated with the environment of the device, run a localization algorithm using privacy preserving techniques;

prior to iterative steps in the localization algorithm reaching a maximum number of iterations, identify at least one break condition released intermittently when running the localization algorithm; and based on the at least one break condition identified while running the localization algorithm, cease the localization algorithm before the maximum number of iterations has been reached and transmitting a localization result to the device.

4. The server of claim 3, wherein identifying the at least one break condition comprises identifying a flag in the localization algorithm.

5. The server of claim 4, wherein the flag comprises plain text.

6. The server of claim 3, wherein the server is adapted to determine whether the at least one break condition reveals a characteristic comprising at least one of:

at least a portion of an input to the localization algorithm;

all of an input to the localization algorithm;

a relative distance between two or more inputs to the localization algorithm;

a correlation between two or more inputs to the localization algorithm; and a distance between a localization output and an initial pose estimate.

7. The server of claim 6, wherein the characteristic is revealed when the localization algorithm is run multiple times on a same input.

8. The server of claim 3, wherein the server is adapted to receive an indication that indicates to the server that the localization algorithm is permitted to be stopped prior to running the maximum number of iterations, wherein the break condition corresponds to the localization algorithm converging to a set value.

9. The server of claim 8, wherein the indication is received with the information.

10. The server of claim 3, wherein the information comprises confidential information associated with the environment of the device.

11. The server of claim 10, wherein the confidential information is a first secret share of a plurality of secret shares, and wherein the plurality of secret shares other than the first secret share are not shared with the server.

12. The server of claim 3, wherein the server performs the localization algorithm using a secure multi-party computation, MPC, protocol.

13. The server of claim 3, wherein:

the environment comprises a three-dimensional, 3D, space in which the device is located; and the information comprises at least one element or feature associated with the 3D space.

14. The server of claim 3, wherein the information comprises at least one of:

one or more two-dimensional, 2D, points;
one or more 3D points;
a security policy;
camera parameters associated with the device; and
sensor parameters associated with the device.

15. The server of claim 3, wherein the localization algorithm comprises iterative computational steps that include at least one of:

computing a singular value decomposition, SVD;
computing a gradient descent, GD;
performing a Gauss Newton optimization; and
performing a Levenberg Marquardt optimization.

16. The server of claim 3, wherein the device comprises an autonomous robotic device and/or assistive user equipment, UE.

17. A device for improving the performance of iterative localization algorithms run using privacy preserving techniques, the device comprising:

memory storing instructions; and processing circuitry operable to execute the instructions to cause the device to:

transmit, to at least one server performing a localization algorithm that includes iterative steps, an indication of at least one break condition to be identified while performing the localization algorithm prior to reaching a maximum number of iterations; and transmit, to the at least one server, at least a portion of information associated with an environment of the device for processing using the localization algorithm.

18. The device of claim 17, wherein the indication is transmitted with the information.

19. The device of claim 17, wherein the device is adapted to receive a localization output from the at least one server, wherein the localization output comprises an estimate of a pose of the device in the environment.

20. The device of claim 17, wherein the at least one break condition comprises a flag in the localization algorithm.

* * * * *